Patented July 19, 1949

2,476,737

UNITED STATES PATENT OFFICE 2,476,737

POLYMERS AND COPOLYMERS OF 2-VINYL-FLUORENE AND THEIR PREPARATION

Edward A. Kern and Royal K. Abbott, Jr., Pittsfield, Mass., assignors to General Electric Company, a corporation of New York No Drawing. Application August 28, 1945, Serial No. 613,209

12 Claims. (Cl. 260—83.7)

This invention relates broadly to polymers and copolymers of vinyl compounds and to methods of preparing the same. More particularly, the invention is concerned with new and useful compositions of matter comprising the product of polymerization of a polymerizable mass containing a monovinylfluorene, more particularly 2-vinylfluorene, as an essential ingredient. Other compositions of the invention comprise the product of polymerization of a mixture of different copolymerizable ingredients including monovinylfluorene, specifically 2-vinylfluorene, and a compound containing a $CH_2=C<$ grouping, more particularly a diene (e. g., butadiene, piperylene, etc.); a vinyl-substituted aromatic hydrocarbon other than a monovinylfluorene such as, for instance, 2-vinylfluorene (e. g., styrene, methylstyrenes, divinylbenzene, vinylnaphthalenes, etc.); an acrylic compound, e. g., acrylonitrile, acrylamide, methacrylonitrile, methacrylamide, an ester of acrylic or methacrylic acid (e. g., methyl acrylate, methyl methacrylate, etc.); an ethylenically-unsaturated aliphatic hydrocarbon (e. g., ethylene, chloroethylenes, fluoroethylenes, chlorofluoroethylenes, etc.); and the like.

In our copending application Serial No. 613,208, filed concurrently herewith and assigned to the same assignee as the present invention, the said application having been issued on September 16, 1947, as U. S. Patent 2,427,337, we have described and claimed a monovinylfluorene, specifically 2-vinylfluorene, and a method of preparing the same. We have discovered that monomeric monovinylfluorene, more particularly 2-vinylfluorene, may be polymerized alone or with other polymerizable compounds, in the presence or absence of a plasticizer (e. g., 2-ethylfluorene, dihydronaphthalene dimer, etc.) or other suitable modifying agent, to yield valuable synthetic compositions (polymers and copolymers) that are useful in various industrial applications, for example in the plastics and coating arts and as dielectric materials in the electrical art. The present invention is directed specifically to compositions comprising polymers and copolymers (interpolymers) prepared from the 2-vinylfluorene (monomeric 2-vinylfluorene) claims in application Serial No. 613,208. 2-ethylfluorene, which may be used in plasticizing the polymers and copolymers of this invention, is prepared as described, for example, in our aforementioned copending application.

Briefly it may be stated that 2-vinylfluorene may be prepared by acetylating fluorene with an acetylating agent, e. g., acetic acid or anhydride, acetyl chloride or bromide, ketene, etc., to obtain 2-acetyl fluorene, hydrogenating the latter to form 2-fluorenylmethylcarbinol, and dehydrating the 2-fluorenylmethylcarbinol to obtain 2-vinylfluorene. The following is illustrative of our method of preparing 2-vinylfluorene:

Preparation of 2-acetylfluorene

Fluorene was dissolved in carbon disulfide in the ratio of one mole of fluorene per liter of solvent. To the resulting solution was added powdered, anhydrous aluminum chloride in the ratio of 1.5 moles aluminum chloride per mole of fluorene. Acetyl chloride in an amount corresponding to 1.2 moles was added to the reaction mass at such a rate as to cause gentle refluxing of the solution. After the main reaction had subsided, stirring and gentle refluxing were continued for a period or 2 hours. At the end of this time hydrolysis was carried out by the addition of water at such a rate as to remove gradually most of the carbon disulfide by distillation. The residue was diluted with trichloroethylene, and the diluted mass was washed first with water, then with a 5% aqueous solution of sodium carbonate, and again with water in order to remove all traces of aluminum chloride. After each washing the aluminum hydroxide that formed was removed by filtration, using a filter aid to facilitate filtration. It is important that the aluminum chloride be removed, since otherwise condensation with the splitting off of water and the partial or complete destruction of the 2-acetylfluorene may occur upon distillation of the reaction mass.

The solvent was removed from the washed mass by vacuum distillation (water pump). The solvent-free residue, containing 2-acetylfluorene and unreacted fluorene, was then distilled under high vacuum, yielding about 10% as a forerun of recovered fluorene, boiling at about 140° C. at 1 mm., or 165° C. at 10 mm. The 2-acetylfluorene was obtained, in a highly pure state and of light color, as a constant boiling fraction at 185° C. at 1 mm., or 210° C. at 10 mm. The product melted at 126°–129° C. and, after recrystallization from benzene, ligroin, absolute alcohol or other suitable solvent, melted sharply at 130–131° C.

Preparation of 2-fluorenyl-methylcarbinol

One hundred (100) grams of 2-acetylfluorene, 100 cc. of absolute ethanol and 6 grams of a hydrogenation catalyst, specifically finely divided copper chromite, where placed in a bomb having a total volume of 480 cc., and the 2-acetylfluorene therein subjected to hydrogenation. At a temperature of 130° C. it was found that the hydrogen pressure dropped from 1850 to 1070 pounds per square inch in about a half hour. This quantity of hydrogen is very close to the one mole theoretically required to reduce 2-acetylfluorene to 2-fluorenyl-methylcarbinol. The reaction product was separated from the ethanol and catalyst. It gave a negative ketone test with 2,4-dinitrophenylhydrazine test reagent, gave a positive Zerewitinoff test, showed approximately 98% active hydrogen, and was readily recrystallized from a mixture of petroleum ether (boiling range 30°–70° C.) and benzene to yield 2-fluorenyl-methylcarbinol as a sparkling white, crystalline material, melting sharply at 140°–141° C. The amount of 2-fluorenyl-methylcarbinol obtained by the hydrogenation of 2-acetylfluorene was almost quantitative.

*Preparation of 2-vinylfluorene*

Fifteen (15) pounds of pure 2-fluorenyl-methylcarbinol was placed in a 12-liter copper flask equipped with a 2-inch-diameter iron column. The column was packed for 24 inches with pellets of activated alumina, approximately 5/32 of an inch in diameter, and was maintained at a temperature of 325° C. The flask was heated electrically, the temperature of the contents during the distillation being kept such that approximately 20 grams of monomer per minute distilled through the column. The crude product from the distillation melted at 114°–119° C.

A sample of crude 2-vinylfluorene, prepared as above described, was recrystallized from a mixture of petroleum ether and benzene. A white, crystalline solid, which melted at 126°–128° C., was obtained. It gave no Zerewitinoff test for active hydrogen. The carbon-hydrogen analysis showed the compound to correspond with the theoretical value for vinylfluorene:

Calculated for $C_{15}H_{12}$ _____ C, 93.75% H, 6.25%
Found _____ C, 93.62% H, 6.41%

Monomeric 2-vinylfluorene may be represented by the formula

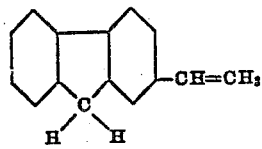

The monomer is a solid at room temperature, the melting point being about 126°–128° C. We have discovered that 2-vinylfluorene polymerizes under heat, e. g., at its fusion temperature or above; and, also, that polymerization may be effected at temperatures lower than its melting point by effecting the polymerization while the monomer is dissolved in a solvent or is in the form of an emulsion or suspension. Some polymerization of 2-vinylfluorene occurs even in its solid state upon standing for a prolonged period or upon exposure to ultraviolet light, especially if the monomer has been recrystallized from certain solvents, e. g., ligroin, and all of the solvent has not been removed.

The polymerization of 2-vinylfluorene and mixtures thereof with other compounds that are copolymerizable with 2-vinylfluorene is accelerated by effecting the polymerization in the presence of a polymerization catalyst. Examples of polymerization catalysts that may be employed are oxygen, ozone, ozonides, hydrogen peroxide, organic and inorganic acids and acidic substances, e. g., hydrochloric acid, hydrofluoric acid, sulfuric acid, boron fluoride, stannic chloride, antimony pentachloride, the halogens (e. g., chlorine, bromine, etc.), etc., organic and inorganic peroxides, for instance peroxides of the aromatic acid series, e. g., benzoyl peroxide, etc., peroxides of the aliphatic acid series, e. g., acetyl peroxide, stearyl peroxide, lauryl peroxide, etc., sodium peroxide, barium peroxide, etc., various per-compounds such as the persulfates, perchlorates, perborates, etc. Also effective in increasing the rate of polymerization are substances having a large surface area, e. g., carbon black, finely divided silica, certain metallic powders and finely divided clays, etc. Heat, light (ultraviolet light) or heat and light may be used with or without a polymerization catalyst in accelerating the polymerization. Any suitable amount of catalyst may be used, but ordinarily the catalyst is employed in an amount ranging, for example, from a trace up to 2 or 3% or more by weight of the monomer or mixture of monomers.

A small amount of solvent has little retarding effect upon, and in some cases actually accelerates, the polymerization of 2-vinylfluorene. A moderately large amount of solvent tends to yield polymeric 2-vinylfluorene of short-chain lengths and often results in a period of incubation so that, even when very active catalysts such as boron fluoride are used, a period of time elapses between the addition of the catalyst and the beginning of polymerization. A very large amount of solvent often inhibits or retards the polymerization of 2-vinylfluorene to such an extent that polymerization is not effected in a reasonable time.

In order to obtain polymeric 2-vinylfluorene of long-chain length, ordinarily it is desirable to start with monomeric material having a high degree of purity. In general the purer the monomer, the more readily polymerization may be effected. We have polymerized pure 2-vinylfluorene to a polymer of high molecular weight, in the absence of a catalyst or solvent, in about 8 hours at a temperature slightly above the melting point of the monomer.

Polymeric 2-vinylfluorene (poly-2-vinylfluorene) is a thermoplastic resin having a high softening point. It may be cast, injection- or pressure-molded, extruded, rolled or machined. Its physical properties may be improved by extending while in plastic condition and then cooling. When cast, poly-2-vinylfluorene is quite brittle. Polymers of greater toughness are obtained when a suitable plasticizer is incorporated therein. Examples of plasticizers that may be employed are diphenyl, terphenyl, fluorene, phenanthrene, dihexyl sebacate, tricesyl phosphate, o-nitrodiphenyl, a diphenyl-diphenylene oxide eutectic mixture, an alkyl-substituted aromatic compound, especially those wherein the alkyl substituent contains not more than six carbon atoms (e. g., dibutyl phthalate, amylnaphthalenes, ethylfluorenes, specifically 2-ethylfluorene, etc.), and the like.

Plasticized, polymeric monovinylfluorene, e. g., 2-vinylfluorene, whether cast or molded, varies from a hard, tough resin when the percentage of plasticizer is relatively small, e. g., from 2 to 10% by weight of the mixture, to flexible, soft masses when the amount of plasticizer is relatively large, e. g., from 20 to 50% by weight of the whole. The highly plasticized poly-2-vinylfluorene may be worked on rolls to form sheets, be fabricated into artificial leathers, or applied to fibers, fabrics, etc., to impart water-repelling characteristics thereto. Because of the relatively high heat-distortion point of polymeric 2-vinylfluorene, which is of the order of 135° C., as much as 20% of a plasticizer such as tricresyl phosphate may be admixed with the polymer to yield a product having a softening point above 125° C. and improved physical properties over the unplasticized polymer. Polymeric 2-vinylfluorene and copolymers of 2-vinylfluorene with other polymerizable materials may be compounded with various fillers, e. g., asbestos, talc, powdered or flake mica, powdered quartz, glass fibers, wood flour, alpha-cellulose, flake aluminum, etc., with or without plasticizers, lubricants (waxes, oils, etc.) and other addition or effect agents, to yield molding compositions that may be molded under heat into molded articles having a wide variety of applications. If desired, monomeric 2-vinylfluorene alone or admixed with other polymerizable compounds, more particularly those which are copolymerizable with the aforesaid monomer, may be cast in the presence or absence of a filler or other modifying agent, and then polymerized in situ to solid state.

In order that those skilled in the art better may understand how the present invention may be carried into effect, the following examples are given by way of illustration and not by way of limitation. All parts and percentages are by weight.

Monomeric 2-vinylfluorene was polymerized alone under heat, with and without a polymerization catalyst, specifically lauroyl peroxide, using different temperatures and periods of time in effecting the polymerization. The conditions of polymerization are shown in Table I.

Table I

| Example | Hours at 100° C. | Hours at 125° C. | Hours at 150° C. | Per Cent By Weight Of Monomer Of Lauroyl Peroxide As Catalyst |
| --- | --- | --- | --- | --- |
| 1 | 40 | | | None |
| 2 | 40 | 24 | | None |
| 3 | 40 | 24 | 24 | None |
| 4 | | | 24 | None |
| 5 | | 24 | 24 | None |
| 6 | | | 24 | None |
| 7 | 24 | | | 0.2 |
| 8 | | 15 | | 0.2 |
| 9 | | | 15 | 0.2 |
| 10 | 24 | 15 | | 0.2 |
| 11 | 24 | 15 | 15 | 0.2 |
| 12 | | 15 | 15 | 0.2 |

The results of the polymerization are shown in Table II.

Table II

| Example | Viscosity In Centipoises At 25° C. Of a 10 Per Cent Benzene Solution Of Mass Containing Polymer And Unpolymerized Monomer | Per Cent Polymer | Viscosity in Centipoises At 25° C. Of A 10 Per Cent Benzene Solution Of— | |
| --- | --- | --- | --- | --- |
| | | | Polymer | Fractionated Polymer |
| 1 | 6.1 | 47.2 | 25.4 | 51.0 |
| 2 | 18.6 | 89.0 | 17.4 | 29.0 |
| 3 | 26.5 | 99.2 | 19.6 | 32.0 |
| 4 | 6.2 | 85.0 | 9.6 | 32.0 |
| 5 | 10.6 | 94.2 | 8.4 | 14.0 |
| 6 | 2.61 | 98.8 | 2.8 | 10.2 |
| 7 | 7.2 | 60.0 | 11.2 | 17.4 |
| 8 | 13.6 | 78.0 | | |
| 9 | 4.4 | 96.0 | | |
| 10 | 14.7 | 81.0 | | |
| 11 | 19.3 | 100.0 | | |
| 12 | 8.7 | 99.2 | | |

The polymerization product of each example was ground in a mortar, the pulverized material then being dissolved in benzene to form a 10% solution of each sample. The viscosities of the resulting solutions are shown in column 2. The polymer in each solution was precipitated by adding the diluted solution to methyl alcohol while vigorously stirring the mixture. The polymer separated as a powder, any unpolymerized monomer remaining in solution. The powdery polymer was separated by filtration, dried in a circulating air oven, and weighed. From this weight the total percent of polymer in the initial polymeric mass of each example was calculated. These percentages are shown in column 3. Each polymer was re-dissolved in benzene to produce a 10% solution, and the viscosity of each solution was determined. These viscosities are shown in column 4. Each solution was next fractionated by stirring methyl alcohol into the solution in such a manner that the short-chain polymer remained in solution while the long-chain polymer was precipitated. The precipitated polymer of each sample was filtered off and dried. The dried, fractionated polymer was dissolved in benzene to make a 10% solution, after which the viscosity of each of the resulting solutions was taken. The viscosity measurements of solutions of these fractionated polymers are shown in column 5.

As shown by the results of Example 6, it is possible to convert almost 100% of the monomer into polymeric material by heating for 24 hours at 150° C. in the absence of a catalyst. However, the resulting polymer has a relatively low molecular weight, and a lower softening point and lesser strength and toughness than the polymers of higher molecular weight. The low-molecular-weight polymers advantageously may be used as softeners or placticizers by being treated in various ways, e. g., chlorinated, sulfonated, nitrated, etc.

When a high yield of high-molecular-weight polymer is desired, a satisfactory procedure is to use the polymerization conditions of Example 3, where the initial polymerization was effected by heating for 40 hours at 100° C., followed by 24 hours' heating at 125° C. and another 24 hours' heating at 150° C. The solid polymer (99.2% yield from the monomer) had a softening point of about 190° to 200° C. and may be used without further purification if desired. Or, if a purer product is needed, it may be dissolved in a suitable solvent, e. g., benzene, and precipitated by the addition of a suitable precipitant, e. g., methyl alcohol. The precipitated polymer is filtered off and heated to remove the last of the solvent. The solid polymer, either with or without further purification, may be ground or otherwise compounded with various fillers and modifying agents (numerous examples of which hereinbefore have been given) to form molding compositions.

Polymers having different physical characteristics are produced by varying the conditions of polymerization. This is shown by, for instance, Examples 2, 4, 5 and 6. In general, the lower the temperature of polymerization, the higher the molecular weight of the polymer, and the lower the total yield of polymer.

Examples 7 to 12, inclusive, show the effect of a catalyst in accelerating the polymerization. Although only lauroyl peroxide was used as a catalyst in these examples, any suitable catalyst (numerous examples of which previously have been given) may be employed. With a polymerization catalyst, the reaction goes faster and usually to a greater degree and at a lower temperature than when polymerization is effected in the absence of a catalyst. Furthermore, in the catalyzed reaction, not only is more polymer usually formed but the distribution thereof in the mass lies much closer to an average value than the polymerization product of a non-catalyzed reaction.

From the foregoing it will be seen that polymeric 2-vinylfluorene obtained by catalytic polymerization of the monomer tends to consist mostly of material having an average molecular weight lying within a relatively short range on a "degree of polymerization" scale and containing relatively little polymeric compound of extremely short or of extremely long chain length. In general, such a polymer has a somewhat higher power factor than one obtained by effecting polymerization in the absence of a catalyst. Hence, when it is desired to obtain poly-2-vinylfluorene of lower power factor, the polymer either should be formed in the absence of a polymerization catalyst or should be purified. In cases where good electrical characteristics and a high degree of purity are required, it is usually advantageous to use the minimum amount of catalyst needed to obtain the desired rate of acceleration.

*Example 13*

One hundred (100) grams of 2-vinylfluorene (approximately 85% 2-vinylfluorene, the remainder comprising 2-fluorenyl-methyl-carbinol and 2-ethylfluorene) was dissolved in 150 cc. benzene. Ten drops of the addition product of boron fluoride and diethyl ether were added to 20 cc. benzene. The resulting solution was slowly stirred into the benzene solution of the monomeric 2-vinylfluorene. Within a short time polymerization began, as evidenced by the evolution of heat, and proceeded so vigorously that the entire reaction mass was brought to the boiling point of the solvent. The hot solution, which had become quite viscous, was heated for 20 minutes and then was allowed to cool to room temperature. The reaction mass was diluted with benzene to a volume of 850 cc., the diluted mass thereafter being poured into methyl alcohol to precipitate the polymer. A yield of 85 grams of polymeric 2-vinylfluorene was obtained.

Instead of the addition product of boron fluoride and diethyl ether, we may use as a polymerization catalyst various other catalysts, e. g., boron fluoride alone, or aluminum chloride, stannic chloride, antimony pentachloride, hydrochloric acid, or other catalysts such as previously have been mentioned.

The amount of solvent may be varied within reasonable limits. However, if the proportion of solvent is less than that employed in this example, the reaction may proceed so vigorously that the reaction mass may foam out of the reaction vessel.

*Example 14*

One hundred (100) grams of 2-vinylfluorene (85%) was dissolved in 150 cc. benzene as in the preceding example. The benzene solution of monomer was cooled to 10° C. by a cold-water jacket, and the water was kept running through the jacket. The reaction was started by adding a few drops of the same catalyst used in Example 13. The solution was cooled and stirred for 6 hours, after which a few more drops of the catalyst were added, and cooling and stirring were continued for an additional 6 hours. The resulting polymeric 2-vinylfluorene was precipitated as in the previous example. It had a higher molecular weight, as shown by viscosity measurements of a solution thereof, than the polymer of Example 13. Polymers of even higher molecular weight are obtained by polymerizing the monomer in, for example, trichloroethylene at temperatures below 10° C., specifically about minus 10° C., using boron fluoride gas in nitrogen as the polymerization catalyst.

*Example 15*

One hundred (100) grams of 2-vinylfluorene (85%) was dissolved in 150 grams of trichlorethylene, after which the solution was heated under reflux at the boiling temperature of the mass for 96 hours. The viscous solution of the resulting polymer was diluted with more trichloroethylene, and the polymer was precipitated by pouring the solution into methyl alcohol as in Examples 13 and 14. A good yield of poly-2-vinylfluorene was obtained by this method.

*Example 16*

One hundred (100) grams of 2-vinylfluorene (85%) was dissolved in toluene. The solution was heated under reflux at boiling temperature for 36 hours. The solvent was removed from the reaction mass under vacuum. A clear, hard, yellowish, glass-like polymer was obtained.

*Example 17*

|   | Parts |
|---|---|
| 2-vinylfluorene | 485 |
| Stearic acid | 42 |
| Sorbitan monolaurate polyoxyalkylene derivative (emulsifying agent) | 15 |
| Di-octyl sodium sulfosuccinate (10% water solution) | 15 |
| Carbon tetrachloride | 15 |
| Sodium carbonate | 15 |
| Potassium persulfate | 15 |
| Di-p-tolyl disulfide | 15 |
| Water | 5000 |

The monomer was melted, and the stearic acid and carbon tetrachloride added thereto. The resulting mixture was stirred into the aqueous solution of the other materials, forming an emulsion. The emulsion was vigorously agitated in a closed reaction vessel for 24 hours at 40° C. (Vigorous agitation is necessary in order to prevent the separation of some of the polymer in the form of a hard mass. Such separated polymer has a lower molecular weight than the emulsified polymer.) The emulsion was broken by adding 0.1 normal HCl solution. The coagulated polymer first was washed with water, then dissolved in benzene, and finally reprecipitated by pouring the solution of the polymer into methyl alcohol.

Especially when purified monomeric 2-vinylfluorene is used, the high-molecular-weight polymer obtained by emulsion polymerization compares favorably in physical and electrical properties with the best polymer obtained by other methods.

*Example 18*

A mixture of 100 grams 2-vinylfluorene (85%), 50 grams water and 1 gram sodium peroxide was heated for 24 hours at 175° C. in a pressure-tight vessel. The polymer was separated from the resulting mass by filtration, ground, washed with water until the washings were approximately neutral to litmus, and finally extracted with hot methanol to remove unreacted monomer and other impurities.

Molding compositions may be made from the ground polymer in the manner aforedescribed. Or, the pulverized polymer may be used to form glass-clear films by dissolving in a suitable solvent, e. g., benzene, and removing the solvent. Although such films are somewhat brittle, this brittleness may be obviated by extending the polymer while in the plastic state and allowing the polymer to cool. Flexible films also may be produced by incorporating a suitable plasticizer into the polymer prior to the formation of the film.

*Example 19*

|  | Parts |
| --- | --- |
| 2-vinylfluorene (85%) | 75.0 |
| Tertiary-butyl hydroperoxide | 1.5 |
| Sodium carbonate | 0.5 |
| Gelatin | 0.4 |
| Lecithin hydrate | 2.0 |
| Water | 400.0 |

The gelatin, lecithin hydrate and sodium carbonate were dissolved or dispersed in water. The tertiary-butyl hydroperoxide was added to the melted 2-vinylfluorene, and the resulting mixture was dispersed in the hot aqueous medium containing the other ingredients while vigorously agitating the mass. The entire mixture was heated under reflux at boiling temperature for 12 hours, vigorous agitation being continued during the entire reflux period. At the end of this period of time, the 2-vinylfluorene had polymerized in the form of slightly colored, opaque globules of irregular size. If desired, the polymer in pellet form may be used as such in certain applications; or, the polymer may be dissolved in benzene or other solvent and precipitated in the form of a powder by mixing the solution of the polymer with a liquid in which the polymer is insoluble, e. g., methyl alcohol, acetone, methyl ethyl ketone, ethyl alcohol, petroleum ether, etc.

*Example 20*

Fifty (50) grams of 2-vinylfluorene, 100 grams of dioxane and 0.25 gram of benzoyl peroxide were heated together under reflux at the boiling temperature of the mass for 48 hours. The resulting viscous solution of polymeric 2-vinylfluorene was diluted with benzene, and the polymer precipitated by mixing the solution with methyl alcohol. The poly-2-vinylfluorene was obtained as a slightly yellowish powder.

In preparing the products of Examples 13, 14, 15, 16, 18 and 19, 85% 2-vinylfluorene was employed. The remainder consisted predominately of 2-ethylfluorene (13 to 15% of total) and 2-fluorenyl-methylcarbinol (0 to 2% of total). Thus it will be seen that the monomeric 2-vinylfluorene of these examples was polymerized in the presence of a plasticizer, which is one reason why no attempt was made to remove the 2-ethylfluorene and 2-fluorenyl-methylcarbinol (if present) prior to polymerization.

The polymers and copolymers of this invention have two general uses:

1. For electrical applications where electrical properties, e. g., power factor, dielectric constant, insulation resistance, etc., and a high softening point are properties of primary importance.

2. For use as a general thermoplastic material where certain physical properties are the criteria.

For the latter purpose, that is, as a general thermoplastic material, a satisfactory procedure is to follow the technique described in the aforementioned examples except that instead of recovering the polymer by precipitating as described, the solvent is removed by vacuum distillation. Thus, by this method in, for instance, Example 13, 100 parts of polymeric mass are obtained instead of 85 parts. This mass is ground and extracted with methanol. After two extractions and drying in a circulating air oven, 97 parts of a plasticized polymeric mass having the following composition is obtained:

|  | Parts |
| --- | --- |
| Poly-2-vinylfluorene | 84 |
| 2-ethylfluorene | 13 |
| 2-fluorenyl-methylcarbinol | Trace |

This plasticized, polymeric 2-vinylfluorene is tougher and less brittle than the pure polymer.

The procedures described under Examples 18 and 19 may be modified, if desired, as follows: Instead of purifying the polymeric mass as described, the mass is ground and washed repeatedly with water until the washings show a pH of 6 to 7. The mass is then extracted twice with methyl alcohol and dried in a circulating air oven. In each case a polymer plasticized with 2-ethylfluorene is obtained.

Another method of incorporating the plasticizer is to mix the plasticizer with substantially pure polymeric 2-vinylfluorene. For instance, a satisfactory plasticized polymer is obtained by mixing, for example, 80 parts by weight of poly-2-vinylfluorene and 20 parts by weight of 2-ethylfluorene at a suitable temperature, e. g., at a temperature above 100° C. Fillers and other addition agents may be incorporated in the composition before, during or after the addition of the plasticizer. The filled, plasticized polymer may be used as a molding compound and for other purposes.

If the chosen plasticizer is not readily compatible with the polymer, compatibility often may be established by kneading the plasticizer and polymer together at an elevated temperature or by working the mixture on rolls that may be heated and cooled. The resulting plastic mass, alone or with other addition agents, may be molded or otherwise fabricated to obtain new and useful articles of manufacture.

A flexible sheet of poly-2-vinylfluorene having a plasticizer incorporated therein is obtained, for example, by working on hot rolls a mixture of, by weight, 70 parts polymeric 2-vinylfluorene and 30 parts dibutyl phthalate. Working is continued until the desired sheet material is obtained. When cooled to room temperature, the resulting sheet is flexible. If it is desired to impart a high polish to the sheet, it may be subjected to pressure between two chromium-surfaced plates at 80° C.

It is often desirable to add more than one plasticizer to secure an effect that is not obtainable with a single plasticizer. This is illustrated by the following formula:

|  | Parts |
| --- | --- |
| Poly-2-vinylfluorene | 70 |
| Tricresyl phosphate | 15 |
| Raw castor oil | 15 |

The raw castor oil increases the flexibility of the polymeric mass and the tricresyl phosphate increases the Shore hardness. The mixture was kneaded in a heated Readco mixer until a plastic mass was obtained. The plastic composition may be fabricated or molded by any of the usual methods. Of course, if desired, poly-2-vinylfluorene may be plasticized with tricresyl phosphate alone. Examples of other plasticizers for 2-vinylfluorene that may be used, in addition to those hereinbefore mentioned, are triphenyl phosphate, blown castor oil, diethyl phthalate and ethyl phthalate ethyl glycolate.

The following examples are directed to the preparation of copolymers or mixed polymerization masses. Table III shows the preparation of polymerization products from mixtures of copolymerizable materials including 2-vinylfluorene and a different vinyl-substituted aromatic hydrocarbon, specifically styrene. The polymerization was effected by heating the mixed ingredients, in the absence of a catalyst, for 48 hours at 100° C. in a closed reaction vessel.

Table III

|  | Example No. | | | | |
|---|---|---|---|---|---|
|  | 21 | 22 | 23 | 24 | 25 |
| Parts 2-vinylfluorene | 38.4 | 38.4 | 19.2 | 19.2 | 9.6 |
| Parts styrene | 5.2 | 10.4 | 10.4 | 20.8 | 20.8 |
| Moles 2-vinylfluorene | 4 | 4 | 2 | 2 | 1 |
| Moles styrene | 1 | 1 | 1 | 2 | 4 |
| Per cent 2-vinylfluorene | 89.1 | 78.7 | 64.9 | 48 | 31.6 |
| Per cent styrene | 11.9 | 21.3 | 35.1 | 52 | 68.4 |
| Properties of polymerization product: |  |  |  |  |  |
| Color | Amber | ← | → | Nearly | water white |
| Character of product | Brittle | ← | | → | Tough |
| Heat-distortion point of purified product, °C | 135 |  |  |  | 90 |
| Dielectric constant | 2.8 |  |  |  | 2.6 |

The copolymers shown in Table III are clear, hard, glass-like, thermoplastic materials having electrical characteristics of the same order as styrene and heat-distortion points considerably higher than that of polystyrene alone and that of a mixture of polystyrene and poly-2-vinylfluorene. These copolymers may be ground and mixed with metallic oxides, barytes, linen rags, and other fillers and addition agents to produce excellent molding compounds.

If desired, unreacted monomeric material and polymerization products of short-chain lengths may be separated by dissolving the polymerization mass in a suitable solvent, e. g., benzene, toluene, chlorobenzene, trichloroethylene, etc., and precipitating the copolymer from solution with methyl alcohol or other suitable precipitant, examples of which have been given under Example 19. The purified copolymer has improved physical properties and a power factor of the same order as polymeric styrene, but a dielectric constant slightly higher than polymerized styrene. The copolymers of Table III, with or without further purification, may be plasticized with various plasticizers, such as hereinbefore mentioned, to yield soft, flexible masses or water-repellent compounds. By varying the amount of plasticizer, compositions ranging from soft, sticky masses to hard, tough resins can be obtained.

Table IV shows other polymerization conditions that may be employed in effecting copolymerization between 2-vinylfluorene and styrene. In all examples the polymerizable mass comprised 19.2 parts (64.9%) 2-vinylfluorene and 10.4 parts (35.1%) styrene.

Table IV

|  | Example No. | | | | | |
|---|---|---|---|---|---|---|
|  | 26 | 27 | 28 | 29 | 30 | 31 |
| Temperature, °C | 80 | 125 | 80<br>100<br>125 | 80 | 100 | 125 |
| Polymerization time, hours | 96 | 36 | 24<br>12<br>12 | 24 | 12 | 12 |
| Benzoyl peroxide, per cent by weight of mixed monomers | None | None | None | 0.5 | 0.5 | 0.5 |
| Per cent of copolymer | 36 | 84 | 96.6 | 85 | 92 | 100 |
| Relative molecular weight | High | Low | Med. | Med. | Med. | Low |

The copolymers of Table IV may be compounded, molded, machined, extruded, cast into films, etc., in the same manner as the copolymers of Table III.

*Example 32*

| | parts |
|---|---|
| 2-vinylfluorene | 65 |
| Styrene | 35 |
| Trichloroethylene | 150 |
| Etherate of boron fluoride in 50 parts trichloroethylene | drops 10 |

The 2-vinylfluorene and styrene were dissolved in the 150 parts of trichloroethylene, after which the 50 parts of trichloroethylene containing the etherate of boron fluoride was added to the solution of monomers, with agitation, in a vessel provided with a reflux condenser. The mixture heated spontaneously and refluxed gently. After the spontaneous reaction had ceased, the solution was heated for 30 minutes at a temperature such that it continued to reflux gently. The resulting viscous solution was diluted with benzene to approximately 5% solids concentration. The copolymer was precipitated by pouring the cold solution into methyl alcohol with vigorous agitation. The yield of copolymer was quantitative, but the product, a white amorphous powder, had a relatively short chain length, being less than 300.

*Example 33*

| | Parts |
|---|---|
| 2-vinylfluorene | 65 |
| Styrene | 35 |
| Trichloroethylene | 200 |

The monomers were dissolved in the trichloroethylene, the resulting solution cooled to about 10% C., and 50 drops of the addition product of boron fluoride and diethyl ether added to the cooled solution with vigorous agitation. The solution was continuously cooled while vigorously agitating the mass for 12 hours. The copolymer that formed was precipitated by pouring the solution into methyl alcohol, or the copolymer may be separated merely by removing the solvent under vacuum. The precipitated material was a white, powdery copolymer having a longer chain length than the copolymer of Example 32. The copolymer obtained by removing the solvent under vacuum is a hard, clear, glassy mass. Copolymers of even longer chain length are produced by effecting the copolymerization at lower temperature using, for example, gaseous boron fluoride as the polymerization catalyst.

*Example 34*

| | Parts |
|---|---|
| 2-vinylfluorene | 19.2 |
| Styrene | 10.4 |
| Toluene | 30.0 | were mixed and heated together under reflux at the boiling temperature of the mass for 48 hours, thereafter being diluted with benzene to approximately 10% solids concentration. The copolymer was precipitated by pouring the cooled solution into methyl alcohol. The 2-vinylfluorene-styrene copolymer thereby obtained was an opaque, white powder.

Example 35

| | Parts |
|---|---|
| 2-vinylfluorene | 19.2 |
| Vinyl bromide | 10.7 |
| Benzene | 40.0 |
| Tertiary-butyl perbenzoate | 0.15 | were mixed and refluxed for 48 hours. The viscous solution was diluted with benzene to about 5% solids content. The resulting product of polymerization was precipitated as in the previous example. It was a powdery material, slightly yellowish in color.

Example 36

| | Parts |
|---|---|
| 2-vinylfluorene | 64.0 |
| Styrene | 35.0 |
| Stearic acid | 4.7 |
| Potassium hydroxide | 1.9 |
| Sodium carbonate | 0.3 |
| Potassium persulfate | 0.3 |
| Sorbitan monolaurate (emulsifying agent) | 0.3 |
| Di-octyl sodium sulfosuccinate (10% water solution) | 0.3 |
| Carbon tetrachloride | 0.3 |
| Di-p-tolyl disulfide | 0.5 |
| Water | 200.0 |

The styrene, 2-vinylfluorene, carbon tetrachloride and stearic acid were dissolved together and poured into the aqueous solution of the other materials while vigorously agitating the mass. The resulting emulsion was placed in a pressure-tight vessel and heated therein for 24 hours at 60° C. with constant agitation. The copolymer was coagulated and precipitated by adding 0.1 normal HCl solution. The copolymer was first washed well with water, then dissolved in benzene, and re-precipitated by pouring the benzene solution into methyl alcohol. The dried copolymer had a fairly high chain length, and in general may be compounded or otherwise processed in the same manner as any thermoplastic resin.

Example 37

| | Parts |
|---|---|
| 2-vinylfluorene | 19.2 |
| Acrylonitrile | 10.6 | were mixed and copolymerized by heating together for 24 hours in a pressure-tight vessel. A tough, opaque resin was formed, which resin was only partly soluble in benzene.

Instead of acrylonitrile, various other acrylic compounds may be employed, for example acrylamide, acrylic acid, methacrylic acid, acrylic and α-substituted acrylic esters (e. g., methyl, ethyl, propyl, butyl, etc., acrylates, methacrylates, ethacrylates and propacrylates), etc. The proportions may be varied widely to obtain mixed polymerization masses or copolymers best adapted to meet a particular service application. The polymerization of the mixed monomers or partial polymers to form copolymers may be carried out by methods such as hereinbefore mentioned, using a catalyst if desired in order to accelerate the polymerization.

Example 38

| | Parts |
|---|---|
| 2-vinylfluorene | 19.2 |
| Methyl methacrylate | 10.0 |
| Benzoyl peroxide | 0.5 |

The above ingredients were heated together for 12 hours at 100° C., yielding a hard, clear copolymer, which was swollen by benzene, trichloroethylene and chlorobenzene.

Many of the copolymers of 2-vinylfluorene with other vinyl compounds are capable of being dissolved, and therefore can be cast to form films, are thermoplastic, and possess physical characteristics that often are more desirable than those of the individually polymerized monomers or of physical admixtures of the polymeric materials. Some of the substituted vinyl compounds and acrylic esters form thermoplastic copolymers with 2-vinyl-fluorene that are insoluble in most organic solvents but still possess many of the other properties of thermoplastics in that they can be molded, plasticized, machined, ground, extruded, worked on rolls, loaded with fillers, etc.

2-vinylfluorene also may be mixed and copolymerized with unsaturated compounds such as isoprene, butadiene (butadiene-1,3), divinylbenzene, acenaphthylene, indene, etc., to provide new and useful compositions. For instance, 2-vinylfluorene and butadiene may be copolymerized in varying proportions to yield compositions ranging in characteristics from a hard, tough resin when the percentage of butadiene is small to rubber-like elastomers that may be compounded with fillers, etc., to form synthetic, rubber-like materials.

Table V shows the results of polymerizing mixtures of 2-vinylfluorene and butadiene at 100° C. for 48 hours using 0.5% by weight (of the mixed monomers) of benzoyl peroxide as a polymerization catalyst, thereby to obtain new and valuable copolymer compositions.

Table V

| | Example No. | | | | |
|---|---|---|---|---|---|
| | 39 | 40 | 41 | 42 | 43 |
| Parts 2-vinylfluorene | 38.4 | 38.4 | 19.2 | 19.2 | 9.6 |
| Parts butadiene | 2.8 | 5.6 | 5.6 | 11.2 | 11.2 |
| Moles 2-vinylfluorene | 4 | 2 | 1 | 1 | 1 |
| Moles butadiene | 1 | 1 | 1 | 2 | 4 |
| Percent 2-vinylfluorene | 93.2 | 87.3 | 77.4 | 63.2 | 46.2 |
| Percent butadiene | 6.8 | 12.7 | 22.6 | 36.8 | 53.8 |
| Character of product | Thermoplastic←——→Elastomer | | | | |

The product of Example 41 is difficultly soluble in solvents such, for example, as trichloroethylene, benzene, toluene, xylene, chlorobenzene, etc., but when dissolved it forms excellent films when cast from solution. The product of Example 43 is an elastomer that may be compounded with other ingredients to yield a rubber-like composition.

When divinyl compounds, e. g., divinylbenzene, etc., are copolymerized with 2-vinylfluorene, the copolymers in general are hard, tough, resinous materials, insoluble in the ordinary solvents, and which can be readily machined without appreciable softening. Similar products are obtained when the copolymerizable monomer is a polyallyl compound, more particularly a polyallyl ester, e. g., diallyl phthalate, diallyl maleate, diallyl itaconate, triallyl tricarballylate, triallyl phosphate, etc., or an unsaturated alkyd resin, e. g., diethylene glycol maleate, glyceryl fumarate, ethylene glycol itaconate, triethylene glycol citraconate, etc.

Example 44

| | Parts |
|---|---|
| 2-vinylfluorene | 90 |
| Divinylbenzene | 10 |
| Tertiary-butyl perbenzoate | 1 | were mixed and poured into long glass tubes, which thereafter were heated in an oven at 125° C. for 24 hours. The copolymer shrank from the sides of the walls and was removed by breaking the glass. A hard, insoluble and infusible product having excellent electrical characteristics, as shown by the following data, was obtained.

| | 60 Cycles | 1 Megacycle |
|---|---|---|
| Power factor, per cent | 0.2 | 0.09 |
| Dielectric constant | 2.7 | 2.7 |

The insulation resistance (ohms/cm.$^2$) was $1.2 \times 10^{15}$.

If desired, a filler (e. g., titanium dioxide, powdered quartz, etc.) may be compounded with the mixed monomers prior to polymerization thereby to obtain a cast article of higher density and increased toughness. Fibrous fillers also improve the toughness of the filled resin, as well as its tensile and shear strengths.

Example 45

| | Parts |
|---|---|
| 2-vinylfluorene | 87 |
| Diallyl phthalate | 8 |
| Plasticizer, specifically dibutyl phthalate | 5 |
| Benzoyl peroxide | 2 | were mixed together, poured into a mold and heated therein first at 100° C. for 24 hours and then at 125° C. for 12 hours. A tough, amber-colored, plasticized copolymer that possessed some elasticity above 125° C. was obtained.

Instead of dibutyl phthalate, the copolymer of this example (and of other examples herein given) may be plasticized with any other suitable plasticizer, e. g., with a single plasticizer or a plurality of plasticizers such as hereinbefore given by way of illustration with particular reference to the preparation of plasticized polymeric monovinylfluorene, specifically 2-vinylfluorene.

Example 46

| | Parts |
|---|---|
| 2-vinylfluorene | 9.0 |
| Ethylene glycol dimethacrylate | 1.0 |
| Powdered quartz | 40.0 |
| Tertiary-butyl hydroperoxide | 0.25 | were mixed to form a dough-like mass, which was placed in a mold and heated therein for 48 hours at 125° C. A hard, dense, grey-colored molded article containing a cross-linked copolymer of 2-vinylfluorene and ethylene glycol dimethacrylate was obtained. The molded mass had excellent physical characteristics.

Example 47

| | Parts |
|---|---|
| 2-vinylfluorene | 19.2 |
| Indene | 11.6 |
| Toluene | 30.0 |
| Tertiary-butyl perbenzoate | 0.3 | were heated together under reflux at the boiling temperature of the mass for 48 hours. The copolymer of indene and 2-vinylfluorene in the resulting viscous solution is of relatively short chain length, and may be separated either by precipitation or by distilling off the solvent under vacuum as described in preceding examples.

Any of the other methods given under the foregoing examples may be employed in effecting copolymerization between indene and 2-vinylfluorene, and the proportions of the two monomers may be varied within wide limits.

Example 48

| | Parts |
|---|---|
| 2-vinylfluorene | 19.2 |
| 2-vinyldibenzofuran | 19.4 |
| Benzoyl peroxide | 0.25 | were mixed and heated first at 65° C. for 24 hours, then at 80° C. for 24 hours, and finally at 100° C. for 12 hours. A hard, glass-like, amber-colored copolymer was obtained. This copolymer was dissolved in benzene, and the resulting solution was poured into methanol to precipitate the copolymer in the form of a white powder. The purified material had a heat-distortion point of 135° to 140° C. It also had excellent electrical characteristics, as shown by the following data:

| | 60 Cycles | 1 Megacycle |
|---|---|---|
| Power factor, per cent | 0.12 | 0.05 |
| Dielectric Constant | 2.8 | 2.8 |

The insulation resistance (ohms/cm.$^3$) was $3.1 \times 10^{15}$.

Example 49

| | Parts |
|---|---|
| 2-vinylfluorene | 19.2 |
| Maleic anhydride | 9.8 |
| Lauroyl peroxide | 0.3 |
| Acetone | 30.0 |
| Benzene | 20.0 | were mixed and heated together for 30 hours at 125° C. in a pressure-tight reaction vessel. A viscous solution containing the polymerization product of 2-vinylfluorene and maleic anhydride was obtained. If desired, this viscous solution may be used as an adhesive or as a coating and impregnating varnish. The viscous mass was diluted with a benzene-acetone mixture, and the copolymer precipitated by pouring the resulting solution into a mixture of 80 parts methyl alcohol and 20 parts water.

If desired, other catalysts such as mentioned hereinbefore may be used in place of lauroyl peroxide. The polymerization proceeds more slowly in the absence of a catalyst.

Example 50

| | Parts |
|---|---|
| 2-vinylfluorene | 19.2 |
| Styrene | 10.4 |
| Sodium peroxide | 0.5 |
| Potassium hydroxide | 0.5 |
| Water | 60.0 | were mixed and heated together for 30 hours at 125° C. in a pressure-tight vessel provided with agitation. The resulting polymeric mass was ground, washed several times with water, extracted with methyl alcohol, and then dried to obtain the copolymer in the form of large, opaque, white granules.

The relative proportions of the monomers, the amount of water and the kind of alkaline substance may be widely varied as desired or as conditions may require. The copolymerization reaction between the 2-vinylfluorene and the styrene proceeds more slowly in the absence of a catalyst.

It will be understood, of course, by those skilled in the art that in the preparation of mixed polymerization products or copolymers we are not limited to the specific proportions of monomers shown in Examples 21 to 50, inclusive. Although the proportions ordinarily will be within the range of, by weight, 10 to 90% 2-vinylfluorene to 90 to 10% of the other monomer or monomers, the amount of 2-vinylfluorene in some cases may be either higher or lower and may be, for instance, from 1 to 99% by weight of 2-vinylfluorene to from 99 to 1% by weight of the other monomeric material or materials. In some instances 2-vinylfluorene that copolymerizes only with difficulty and to a small extent with another monomer will, when a third monomer is introduced into the polymerization system, readily form a mixed polymer or copolymer of the three monomers.

Various polymerizable compounds may be simultaneously polymerized or copolymerized with a monovinylfluorene, specifically 2-vinylfluorene, to obtain new and useful synthetic compositions, for instance any compound containing a $CH_2=C<$ grouping (polymerizable $CH_2=C<$ grouping) in its molecular structure, that is, compounds containing a single $CH_2=C<$ grouping or a plurality (two, three, four or more) of $CH_2=C<$ groupings in the structure of the individual compound. Examples of such compounds are the esters, nitriles and amides of acrylic and α-substituted acrylic acids, vinyl esters and halides, methylene malonic esters, mono- and poly-allyl compounds, e. g., the di-, tri-, tetra- (and higher) allyl derivatives. For instance, the copolymerizable material may be a polyallyl ester of an inorganic polybasic acid, of a saturated or unsaturated aliphatic polycarboxylic acid or of an aromatic polycarboxylic acid. Specific examples of compounds that may be employed, in addition to those hereinbefore mentioned, are:

Benzyl acrylate
Benzyl methacrylate
Methyl alpha-chloroacrylate
Ethyl alpha-bromoacrylate
Propyl alpha-chloroacrylate
Para-chlorostyrene
Allyl acrylate
Allyl methacrylate
Methallyl acrylate
Di- and tri-chlorostyrenes
Chlorinated divinylbenzenes
Vinyl methyl ether
Vinyl ethyl ether
Divinyl ether
Methylene methyl malonate
Methylene ethyl malonate
Vinyl chloride
Vinylidene chloride
Diethylene glycol dimethacrylate (diethylene dimethacrylate)
Glyceryl triacrylate
Ethylene glycol diacrylate (ethylene diacrylate)
Diethylene itaconate
Diethyl maleate
Dimethyl fumarate
Para-chlorobenzyl acrylate
Diallyl fumarate
Diethyl itaconate
Diallyl citraconate
Divinyl biphenyl
Vinyl methyl ketone
Cyclopentadiene
2-chloro-butadiene-1,3 (Chloroprene)
2,3-dimethyl-butadiene-1,3
Chlorinated methylstyrenes
Chlorinated vinylnaphthalenes
Hexadiene-1,5
Octadiene-1,4
2-cyano-butadiene-1,3
Dimethallyl maleate
Dimethallyl itaconate
Dimethallyl phthalate
Amyl acrylate
Hexyl methacrylate
Triallyl citrate
Triallyl aconitate
Vinyl acetate
Vinyl propionate
Vinyl butyrate Unsaturated alkyd resins other than those hereinbefore mentioned may be simultaneously polymerized or copolymerized with a monovinylfluorene, specifically 2-vinylfluorene, to obtain new and useful synthetic compositions, for instance unsaturated alkyl resins such as given in D'Alelio Patent No. 2,323,706 on page 3, line 46, column 2, through line 39, column 1, page 4.

The polymers and copolymers of this invention have a wide variety of commercial applications. They may be used alone or in combination with other insulating materials, e. g., paper, fabric materials formed of glass fibers, cotton, silk, rayon, nylon, etc., sheet asbestos, cellulose esters (e. g., cellulose acetate, cellulose acetobutyrate, etc.), cellophane, etc., as dielectric materials in electrical apparatus. For instance, capacitors and other electrical devices may contain a dielectric material comprising the product of polymerization of a polymerizable mass containing 2-vinylfluorene as an essential ingredient. Paper-insulated capacitors wherein paper impregnated with a composition comprising polymeric 2-vinylfluorene constitutes the dielectric material is a more specific example of the use of the compositions of our invention in electrical applications. Such capacitors may be produced in accordance with conventional manufacturing technique, for instance as described and illustrated in Clark Patent No. 1,931,373 with particular reference to a different impregnant. Our new polymers and copolymers also may be employed as cable impregnants, in impregnating electrical coils, as filling compounds in potheads and cable joints, and in numerous other electrical applications. The device to be treated may be impregnated or filled with the polymerizable material (e. g., monomer, partial polymer, mixture of monomers, mixture of partial polymers, or mixture of monomer and partial polymer), and polymerization effected in situ.

What we claim as new and desire to secure by Letters Patent of the United States is:

1. A composition comprising the product of polymerization of a polymerizable mass containing 2-vinylfluorene as an essential ingredient.

2. A composition of matter comprising a polymer of 2-vinylfluorene and a plasticizer therefor comprising tricresyl phosphate.

3. A composition comprising the product of polymerization of a mixture of different copolymerizable ingredients including 2-vinylfluorene and a compound containing a $CH_2=C<$ grouping, the 2-vinylfluorene comprising, by weight, from 1 to 99 per cent of the total weight of the copolymerizable ingredients.

4. A composition comprising the product of polymerization of a mixture of copolymerizable ingredients including 2-vinylfluorene and a diene, the 2-vinylfluorene comprising, by weight, from 1 to 99 per cent of the total weight of the copolymerizable ingredients.

5. A copolymer of ingredients including 2-vinylfluorene and butadiene, the 2-vinylfluorene comprising, by weight, from 1 to 99 per cent of the total weight of the latter and the butadiene.

6. A composition comprising the product of polymerization of a mixture of copolymerizable ingredients including 2-vinylfluorene and a different vinyl-substituted aromatic hydrocarbon, the 2-vinylfluorene comprising, by weight, from 1 to 99 per cent of the total weight of the copolymerizable ingredients.

7. A copolymer of ingredients including 2-vinylfluorene and styrene, the 2-vinylfluorene comprising, by weight, from 1 to 99 per cent of the total weight of the latter and the styrene.

8. A copolymer of ingredients including 2-vinylfluorene and acrylonitrile, the 2-vinylfluorene comprising, by weight, from 1 to 99 per cent of the total weight of the latter and the acrylonitrile.

9. The method of preparing new synthetic compositions which comprises heating a polymerizable mass containing 2-vinylfluorene as an essential ingredient until a polymeric product is obtained.

10. The method of preparing new synthetic compositions which comprises heating a polymerizable mass containing 2-vinylfluorene as an essential ingredient in the presence of a polymerization catalyst comprising lauroyl peroxide.

11. The method of preparing new synthetic compositions which comprises (1) forming a mixture of different copolymerizable ingredients including 2-vinylfluorene and a compound containing a $CH_2=C<$ grouping, the 2-vinylfluorene comprising from 1 to 99 per cent, by weight, based on the total weight of the copolymerizable ingredients, and (2) heating the mixture until a polymeric product is obtained.

12. The method of preparing new synthetic compositions which comprises forming a mixture containing (1) a plurality of different copolymerizable ingredients including (a) 2-vinylfluorene and (b) a compound containing a polymerizable $CH_2=C<$ grouping, the 2-vinylfluorene comprising from 1 to 99 per cent, by weight, based on the total weight of the copolymerizable ingredients, and (2) a catalyst for accelerating the copolymerization of the ingredients of (a) and (b) comprising benzoyl peroxide, and thereafter heating the aforesaid mixture until a polymeric product is obtained.

EDWARD A. KERN.
ROYAL K. ABBOTT, JR.

No references cited.